United States Patent [19]
Yamada

[11] 3,856,285
[45] Dec. 24, 1974

[54] SHOCK ABSORBING APPARATUS

[76] Inventor: Akio Yamada, 20-21 Suehiro 1-chome, Ichinomiya, Japan

[22] Filed: Dec. 26, 1973

[21] Appl. No.: 427,638

Related U.S. Application Data

[63] Continuation-in-part of Ser. No. 271,914, July 14, 1972, abandoned.

[30] Foreign Application Priority Data
   July 16, 1971   Japan.............................. 46-52990
   May 15, 1972   Japan.............................. 47-47873

[52] U.S. Cl.......267/9 C, 188/129, 188/271, 213/22
[51] Int. Cl................B60g 13/02, B60g 15/04
[58] Field of Search............. 188/129, 271; 213/22; 267/9 A, 9 C, 139; 293/84

[56]              References Cited
                 UNITED STATES PATENTS
2,212,759    8/1940   Tea...................................... 267/9 C
2,705,634    4/1955   Sampson et al.................... 267/9 C

*Primary Examiner*—George E. A. Halvosa

[57]              ABSTRACT

An apparatus to be installed on an automobile or other type of vehicle for relieving an impact created by a collision of the vehicle or otherwise. The apparatus comprises an elastically deformable component housed in a casing to absorb power generated in an instant by the friction caused between the peripheral surface of the deformable component and the inner surface of the casing on occurance of an impact to the vehicle. The provision of an elastic means, such as a coiled spring, housed in the casing and positioned to press against the deformable component allows the deformable component to return to its original position on termination of the impact, while at the same time, the elastic nature of the deformable component causes the component to restore its original shape, so that the apparatus according to this invention can successfully withstand repeated use.

11 Claims, 14 Drawing Figures

SHOCK ABSORBING APPARATUS

RELATED APPLICATIONS

This application is a continuation-in-part of application Ser. No. 271,914, filed July 14, 1972, now abandoned, by the same inventor and bearnig the same title.

SUMMARY OF THE INVENTION

This invention relates to a shock absorber for an automobile or other type of vehicle, and more particularly to an apparatus to be installed on such vehicle for relieving an impact created by collision of the vehicle.

Various sring means, such as a coiled spring, a laminated spring, a countersunk spring, a ring spring, and rubber, have often been used as a working medium for vehicle shock absorbers known in the art. One of the drawbacks of these spring means, except a ring spring, has, however, been their relatively small hysteresis which causes the means to release most of the energy that they have absorbed. It is desirable that a shock absorbing apparatus absorb and dissipate energy with a substantially equal buffer force over its entire working stroke (hereinafter called "equal buffer force"), but if this requirement is to be met by a spring as has been attempted in the art, it is necessary to set the spring constant at a considerably small value and apply a considerably great initial load to actuate the shock absorbing apparatus. Consequently, the shock absorbing apparatus known in the art, which employs a spring in various forms as its working medium, is unreasonably big and heavy. There has also been proposed an apparatus in which a metallic component is used as a working medium, and its plastic deformation is utilized to absorb a high striking energy with an equal buffer force, but such metallic component is incapable of returnng to its original shape after it has been plastically deformed, and the apparatus is unable to be used repeatedly.

It is, therefore, an object of this invention to eliminate the above-mentioned drawbacks of the shock absorbing apparatus known in the art, and provide an improved shock absorbing for use on a vehicle, including as a working medium an easily elastically deformable component housed in a casing in a substantially close contact with the inner surface of the casing, and urged by a spring. According to the apparatus of this invention, the inner surface of the casing prevents the elastically deformable component from expandng substantially laterally at the time of impact. Consequently, a by far stronger dynamic drag during impact in comparison with a static load is suddenly generated between the component and the inner surface of the casing. This drag force is kept substantially constant over the length of the working stroke of the apparatus, and the frictional drag (frictional force per unit area) developed by the above-mentioned expansive pressure is kept near the maxium allowable shearing stress of the material of the elastically deformable component over the greater part of the peripheral surface of the deformable component. Thus, the apparatus produces a substantially equal buffer force over its whole workng stroke, and absorbs a high energy impact very effectively. On disappearance of the stock or impact, the deformable component is pushed back by the spring, and returns to its original position.

It is another object of this invention to provide a shock absorbing apparatus including an elastically deformable component, and suitable for repeated use as it is designed to maintain the frictional drag acting on the deformable component when the component has received an impact, up to but not greater than the maxium allowable shearing stress for the component.

It is still another object of this invention to provide a shock absorbing apparatus including a casing, an elastically deformable component housed in the casing, and a spring likewise housed in the casing and positioned to urge the deformable component. The spring is loaded to an extent necessary to keep the deformable component pressed against the inner surface of the casing so that a static frictional contact is maintained between the peripheral surface of the deformable component and the inner surface of the casing.

It is a furthur object of this invention to provide a shock absorbing apparatus for a vehicle including an elastically deformable component, the material and shape of which are selected so that the apparatus may absorb an impact by moving the component through strokes of different length to accommodate impacts of different intensities at the time of its collision.

As briefly stated in connection with several objects of this invention, this invention provides a very effective shock absorbing apparatus which is very simple in construction, but is capable of generating a large buffer dynamic force against an impact of shock occurring by a collision or otherwise to an automobile or other type of vehicle on which the apparatus is installed. The apparatus according to this invention essentially comprises a casing, an easily elastically deformable component housed in the casing in virtually close contact between the peripheral surface of the component and the inner surface of the casing, and a spring likewise housed in the casing and positioned to urge the deformable component to an initial position and maintain the virtually close contact between the deformable component and the casing. Since it is housed in the casing in a substantially close contact with the inner surface thereof, the elastically deformable component is prevented, when a shock or impact is generated by a collision of the vehicle, from undergoing any substantial lateral expansion that would occur but for the restriction of the casing. A frictional drag develops between the deformable component and the casing on lateral expansion larger than that which exists in a static situation. The frictional force due to the lateral pressure is brought close to or almost equal to the maximum allowable shearing stress for the deformable component over the greater part of the peripheral surface therof, whereby the apparatus according to this invention is enabled to absorb all the striking energy with an equal buffer force. Moreover, this invention can be used on a great many different types of vehicles by changing the material and shape of the elastically deformable component over a wide range to match the estimated impact of a particular type of vehicle. The initial setting of the spring can be altered. Further, even if the apparatus according to this invention is subjected to the maximum allowable shearing stress permissible on the elastically deformable component, the damage, if any, of the deformable component resulting therefrom is restricted to the surface thereof, so that the apparatus can be satisfactorily used again.

DESCRIPTION OF THE PREFERRED EMBODIMENT

Figure 1:
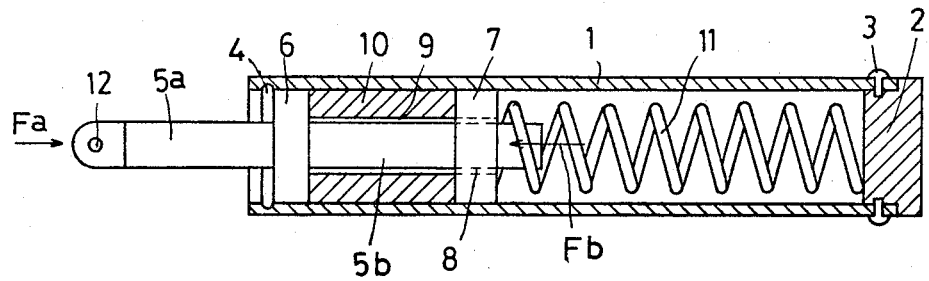
FIG. 1 is a vertical cross-sectional view of a preferred embodiment of this invention.

The apparatus shown in FIG. 1 includes a tubular casing 1 which is provided at one end therof with a cover 2 secured thereto by screws 3, and at the other end thereof with a snap ring 4 fitted thereinto. A piston 6 having a pair of piston rods 5a and 5b projecting in opposite directions therefrom is slidably positioned in the casing 1, and secured by the snap ring 4 in the casing 1. One of the piston rods 5b, slidably protrudes through a central hole 8 of a guide member 7 slidably provided in the casing 1. A readily elastically deformable component 10 is provided in the space between the piston 6 and the guide member 7, and has a longitudinal axial hole 9 through which the piston rod 5b protrudes into the guide member 7 with some clearance therebetween as shown in FIG. 1. The component 10 may be formed of such material in the solid form as natural rubber, synthetic rubber, a natural rubber compound, synthetic rubber compound, silicon rubber, urethane, soft nylon, soft polyvinyl chloride, and soft polyethylene, polymers or copolymers. A coiled spring 11 is provided in the casing 1, and is positioned between the cover 2 and the guide member 7 to press against the guide member 7, which in turn presses against the deformable component 10. It will thus be noted that there exists a certain amount of frictional contact between the inner surface of the casing 1 and the peripheral surface of the component 10. The other piston rod 5a is provided at the free end thereof with a hole 12 for fitting the apparatus to a vehicle. Normally, the shock absorber will be connected between a bumper and the frame.

Figure 3:
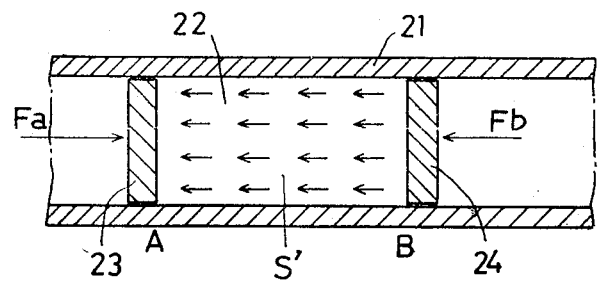
FIGS. 3 to 8 illustrate the principle of this invention.
Figure 4:
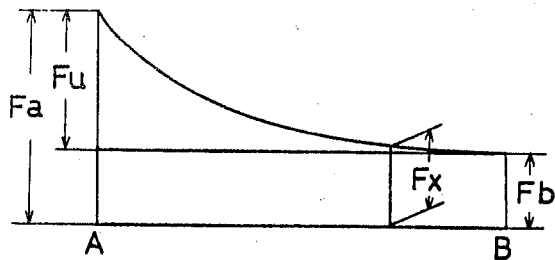

Attention is directed to the function of the elastically deformable component 10 prior to description of the operation of the apparatus. Referring to FIG. 3 of the drawings, there is shown a tubular casing 21 housing a readily elastically deformable component 22 with a slight clearance left between the peripheral surface of the component 22 and the inner surface of the casing 21, and the component 22 is interposed between a pair of guide members 23 and 24 slidably provided in the casing 21. If the two compressive forces Fa and Fb acting on the guide members 23 and 24 respectively in the directions of the arrows shown in FIG. 3 are so related to each other that the force Fa is larger than the force Fb, the guide member 23, the deformable component 22 and the guide member 24 are moved together gradually toward the right as viewed in FIG. 3, but at the same time, the component 22 is caused to expand laterally, and presses against the inner surface of the casing 21, so that a frictional drag force develops between the peripheral surfce of the component 22 and the inner surface of the casing 21. The total amount of the frictional stress thus generated, or the friction force produced over the entire surface of contact between the component 22 and the casing 21 is represented by the following formula:

$$Fu = Fa - Fb \quad (1)$$

as illustrated in FIG. 4.

Figure 5:
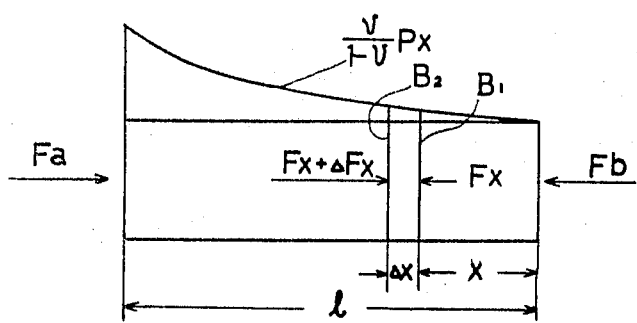

Referring to FIG. 5, the pushing force $F_x$ acting on a cross section $B_1$ spaced a distance $x$ from one end B of the component 22 and the pushing force $F_x + \Delta F_x$ on a cross section $B_2$ spaced a distance $x + \Delta x$ from the end B are related to each other as the following formula shows:

$$F_x + \Delta F_x = F_x + \lambda \, v/1 - v \, P_x \, s \, \Delta x \quad (2)$$

wherein $P_x$ is a stress acting longitudinally on the section $B_1$, and $v$ is the Poisson's ratio of the component 22. Accordingly, $v/1 - v \, P_x$ is a pressure exerted by the component 22 on the casing 21, and $\mu \, v/1 - v \, P_x$ represents a friction force (friction stress) caused by the above pressure on each unit surface area of the casing 21 and the component 22. $s$ is an area of contact between the casing 21 and the component 22 per unit length of the component 22. If a cross-sectional area of the component 22 is represented by the letter S, the relation between $P_x$ and $F_x$ is represented as $P_x = F_x/S$, and substituted into the formula (2) to obtain the following formula:

$$\Delta F_x/F_x = \lambda v s \,/(1 - v)S \Delta_x = k \Delta_x \quad (3)$$

By integrating this formula, the following formula is obtained:

$$\log F_x = K_x + C \quad (4)$$

Since $F_x$ is equal to Fb when $x$ is zero, $$C = \log Fb$$

Hence, $$\text{Log } F_x/Fb = k_x \quad (5)$$

Namely, $$F_x = Fb \, e^{kx} \quad (6)$$

Since $Fx$ is $Fa$ when $x$ is $l$, $$Fa = Fb \, e^{kl} \quad (7)$$

Thus, the shock absorbing force of the apparatus is enlarged to $e^{kl}$ times as large as the force $Fb$ exerted by a spring. Since $k$ is equal to $\mu \, v \, s/(1 - v)S$, and also as the total area of contact between the casing 21 and the component 22 is representned by $S'$ and is equal to $Sl$, equation (7) can be rewritten as follows:

$$Fa = Fb\, e\, \mu v S'/(1 - v)S \tag{8}$$

The formula (8) represents the shock absorbing force of the apparatus which is generated assuming that the friction force acting on the end A of the deformable component 22 is less than the maximum allowable shearing stress for the component 22.

Figure 6:
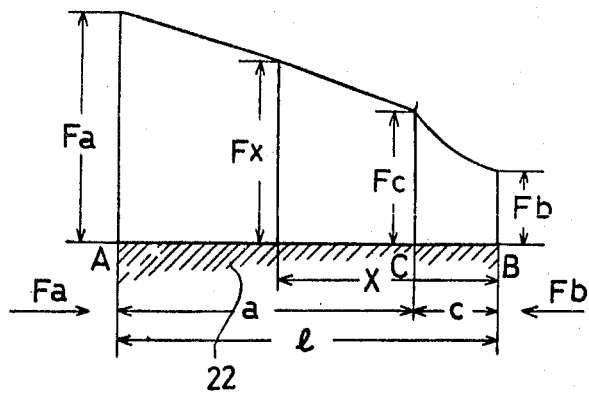

The following is a description of the case in which the friction force acting on the end A of the component 22 is larger than the maximum allowable shearing stress for the component 22. Referring to FIG. 6, if the friction stress $\mu v/1 - v\, P_x$ generated between the casing 21 and the component 22 and the maximum allowable shearing stress, max, for the surface of the component 22 are equal to each other at a distance $x = C$ from the end B of the component 22, and if the friction stress equal to the maximum allowable shearing stress $\tau$max is considered as acting on any portion of the entire surface of the component 22 behind the position $C$, the shock absorbing force, $FX$, of the component is a position spaced the distance $x$ from the end B is represented by the following formula $FX$ $$= Fc + \tau\text{max}\, s\, (x - C) \tag{9}$$

where the distance $X$ is in the range of 0 to $C$, the force is determined by the formula (6). While the formula $Fc = Fb\, e^{kc}$ yields $Fc = PcS$ when the stress at the point $C$ is represented by $Pc$, the following relation exists:

$$\tau\text{max} = \mu v /1 - v\, Pc \tag{10}$$

and the following formula is established:

$$Fc = 1 - v/\mu v \tau\text{max}\, S \tag{11}$$

The formula (11) is substituted into the formula (9) to arrive at the following formula:

$$F_x = 1 - v/\mu v \tau\text{max}\, S + \tau\text{max} s\, (X - c) \tag{12}$$

and since the distance $X$ is $l$ at the end $A$, $$Fa = 1 - v/\mu v \tau\text{max}\, S + \tau^{max} s(l - c) \tag{13}$$

As there exists the relation $s - S'/a + c$ wherein $S'$ is the total area of contact between the casing 21 and the component 22, the following relation is established:

$$Fa = 1 - v/\mu v \tau\text{max}\, S + a/a + c\tau\text{max}\, S'$$
$$= (1 - v/\mu v S + a/l\, S')\, \tau\text{max} \tag{14}$$

While the foregoing description has been concerned with the case in which the elastically deformable component functions slowly, the apparatus has been found to function differently, and develop a much larger shock absorbing force if a load is applied to it impulsively. This is assumed to be due to the viscosity of the deformably component, and the results of the experiments done teach that a greater lateral pressure is exerted on the deformable component when the speed of a vehicle is high at the time of its collision, than when there merely exists a static load acting on the component. The effect of impulsive loading seems to correspond to an increase in the area of the surface where the friction stress acting on the surface of the deformable component is equal to the maximum allowable shearing stress $\tau$max for the component, so that the shock absorbing force developed by the apparatus increases accordingly.

The inter-relationship of the material, size and shape of the deformable component, and of the amount of the load appplied to the spring in relation to an anticipated speed of a vehicle at the time of its collision is believed to permit successful operation of the apparatus according to this invention by maintaining the friction stress acting on the deformable component substantially equal to the maximum allowable shearing stress $\tau$max for the component all over the surface thereof. The shock absorbing force developed in this case by the apparatus is represented by the following formula:

$$Fa = S \times \tau\text{max} + Fb$$

Accordingly, a series of tests may be conducted by changing the speed of the vehicle and hence the rapidity of an impulse force to obtain an anticipated amount of striking energy generated by such collision, and such anticipated energy may be used as the basis for selecting the material, size and shape of the deformable component and the load to be applied to the spring. It will be noted that the deformable component 22 is pushed back by the spring to its original position, and returns to its original shape due to its elastic nature.

Figure 7:
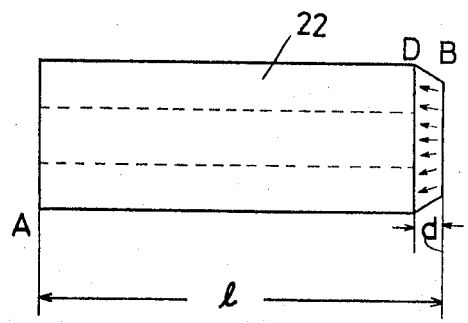
Figure 8:
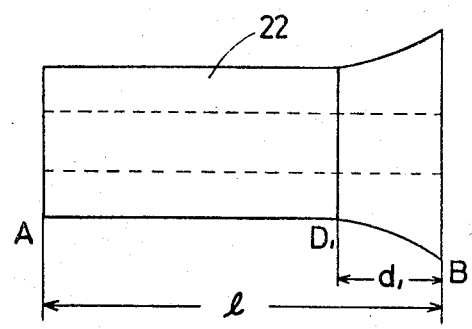

It should be noted that the shock absorbing force $Fa$ of the apparatus can be increased by forming the deformable component 22 with differently sized or shaped cross-sections along the length therof. An example of such a differently shaped deformable component is shown in FIG. 7. The deformable component 22 shown in FIG. 7 has a tapered end portion beginning at a point D and terminating at the end B. The axial length of the tapered end portion is preferably in the range of one-third to two-thirds of the overall length of the component 22, and the smallest outer diameter of the tapered portion at the end B is preferably equal to the outer diameter of the non-tapered portion of the component 22 less one-third to two-thirds of the thickness of the non-tapered portion. When a force has acted on the end B of the component, the stress generated is radially diverged from the center of the cross-section of the component as shown by a plurality of small arrows in FIG. 7, and the radial components of force thus produced are added to the lateral pressure $v/1 - vPd$ at the point $D$, wherein $Pd$ is the axial pressure at $D$, so that the friction stress developed by the force acting on the end B of the component 22 is considerably increased, and is approximately equal to the maximum allowable shearing stress $\tau_{max}$ for the component at or in the vicinity of the point D. FIG. 8 shows another example of a differently shaped deformable component 22, which has one end portion of radially decreasing diameter from the end B toward an intermediate portion $D_1$. The deformable component 22 is housed in the casing 21 in a compressed form. When the component has received an impact, the friction stress developed by the impact becomes constant over the area defined between the end B and the section $D_1$, and the apparatus can absorb the anticipated amount of striking energy within the limit of the shearing stress allowable for the component 22.

Figure 2:
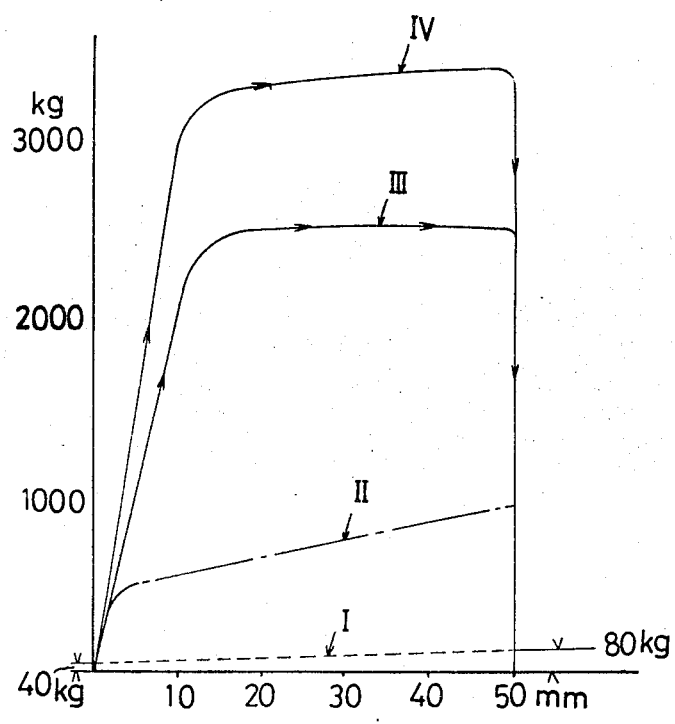
FIG. 2 shows the shock absorbing characteristics of the apparatus shown in FIG. 1.

FIG. 2 shows the results of tests conducted with the apparatus shown in FIG. 1. In FIG. 2, the absicissa indicates the stroke of the piston 6, and the ordinate the shock absorbing force of the apparatus. The apparatus used in the tests had a deformable component 10 measuring 3 cm in outer diameter by 6 cm in length, and made of natural rubber. The rubber component had a hardness of 60°, a coefficient of dynamic friction of 0.3, and a tear resistance stress of 110 kg/cm². Curve I shows the characteristics of the coiled spring 11 used. As shown, the spring was loaded with an initial force of 40 kg, and exerted a resistance of 80 kg when displaced by 50 mm. Curve II shows an increase in the shock absorbing force developed by the apparatus with the displacement of the piston when the force $Fa$ was applied thereto statically. It will be seen that the apparatus developed a shock absorbing force of approximately 900 kg when the piston was displaced by 50 mm. Curves III and IV show the shock absorbing forces developed by the apparatus which was running at speeds of 4 km/h. and 8 km/h. respectively when a load of 1,200 kg was applied thereto. It will be seen from Curve III that the friction stress developed between the casing 1 and the deformable component 10 was equal to the maximum allowable shearing stress for the component 10 over a certain length of the component 10 between the rear end and an intermediate portion thereof, while Curve IV shows that such frictional stress became equal to the maximum allowable shearing stress over a longer area of the component 10 when the speed at which the apparatus was moving at the time of application of an impact was increased.

It will be apparent from FIG. 2 that the apparatus according to this invention generates a by far larger shock absorbing force when the load $Fa$ has been applied thereto dynamically than when it has been applied statically, and that the shock absorbing force of the apparatus shows a remarkable increase in the beginnng of displacement of the piston, while it remains substantially constant or equal throughout the rest of the stroke of the piston. This is obviously due to the fact that as hereinbefore mentioned, the elastically deformable component 10 which tends to laterally expand rapidly upon receiving an impact thereon is prevented by the casing 1 from expanding, so that a high lateral pressure is generated in a moment between the inner surface of the casing 1 and the peripheral surface of the component 10, and develops a frictional stress therebetween, and that such frictional stress remains substantially equal to the maximum allowable shearing stress for the component 10 throughout the stroke of displacement of the piston 6, and acts on the greater part of the area of contact S' between the casing 1 and the component 10. It is because of a certain increase in the range of the maximum allowable shearing stress for the component 10 due to an increase in the restoring force of the spring 11 that Curves III and IV are not exactly parallel to the abscissa, but show a slight upward slope with an increase in the displacement of the piston. It will be understood that a rapid increase in the lateral pressure as hereinbefore mentioned results in a marked increase in the energy absorbing power of the apparatus. It will further be noted that upon termination of the impact that the piston 6 is caused to return to its original position by the restoring force of the spring 11, whereupon the spring 11 again remains loaded with a pressure of 40 kg.

Figure 9:
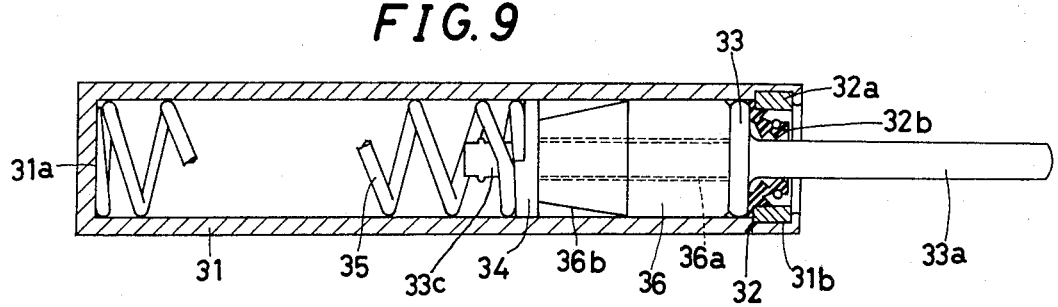
FIG. 9 is a vertical sectional view of another preferred embodiment of this invention.
Figures 10, 11:
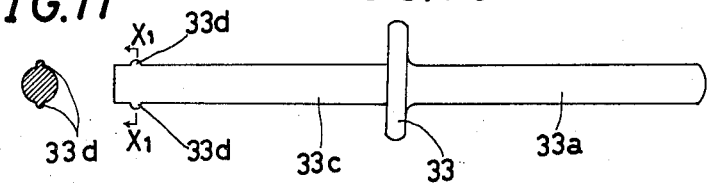
FIG. 10 is a side view of the piston and piston rod assembly employed in the apparatus shown in FIG. 9.
FIG. 11 is a cross sectional view taken along the line XI—XI of FIG. 10.

Referring now to FIG. 9, another preferred embodiment of this invention comprises a tubular casing 31 which is closed at one end 31a. The tubular casing 31 includes an annular groove 31b formed on the inner surface at the opposite open end thereof. A seal member 32 is positioned in the annular groove 31b and comprises a cylindrical metal element 32a fitted in the groove 31b, and a rubber element 32b. A piston 33 is slidably positioned in the cashing 31 inwardly adjacent to the seal member 32, and held by the metal element 32a against escape from the casing 31. An outer piston rod 33a is integrally connected with the piston 33 at one end in a coaxial relation to the piston 33 and extends outwardly through the open end of the casing 31. The rubber element 32b encircles the outer piston rod 33a and closes the open end of the casing 31 to prevent dust, mud, water or any other foreign material from entering the casing 31. The outer piston rod 33a is slidable relative to the rubber element 32b upon movement of the piston 33 in the casing 31. An inner piston rod 33c is connected at one end integrally with the opposite side of the piston 33 from the outer piston rod 33a and extends in a coaxial relation to the piston 33 and the outer piston rod 33a with its inner end terminating intermediate the ends of the casing 31. A pair of protuberances 33d are formed on the inner piston rod 33c somewhat inwardly of the end thereof in a diametrically opposite relation to each other as best shown in FIG. 11 for purposes which will become apparent.

Figures 12, 13:
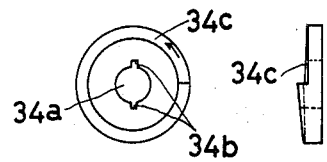
FIG. 12 is a plan view of the guide member employed in the apparatus shown in FIG. 9.
FIG. 13 is a side view of the guide member.

A generally flat, circular guide member 34 is slidably positioned in the casing 31 and spaced inwardly from the piston 33. As shown in FIG. 12, the guide member 34 is centrally formed with a circular opening 34a and two notches 34b are formed in the perimeter of the opening 34a in a diametrically opposite relationship to each other. The inner piston rod 33c slidably extends through the central opening 34a of the guide member 34 as shown in FIG. 9. The notches 34b formed in the guide member 34 allow the guide member 34 to move past the protuberances 33d on the inner piston rod 33c upon alignment of the protuberances 33d with the notches 34b. A coil spring 35 is interposed between the closed end 31a of the casing 31 and the guide member 34. Adjacent to its outer periphery, the guide member 34 is formed on one side thereof with a short radially extending shoulder defining an annular slope 34c as shown in FIGS. 12 and 13. The annular slope 34c is spiraled in a manner complementary to the spiral of the coil spring 35 and one end of the coil spring 35 is engaged with the annular slope 34c of the guide member 34, while the other or inner end of the coil spring 35 is held against the inner surface of the closed end 31a of the casing 31.

A readily elastically deformable component 36 is positioned in the space between the piston 33 and the guide member 34 in close contact therewith, and has an axial hole 36a which is coaxial with the piston 33 and the inner piston rod 33c. The axial hole 36a of the component 36 has a slightly greater diameter than the inner piston rod 33c. The inner piston rod 33c extends through the axial hole 36a as illustrated in FIG. 9. The component 36 may be formed from a solid cylindrical mass of any appropriate elastic material such as natural rubber, synthetic rubber, natural rubber compounds, synthetic rubber compounds, silicon rubber, urethane rubber, soft nylon, soft polyvinyl chloride or soft polyethylene, and is preferably made as a unitary member. The component 36 has a tapered portion 36b diminishing in outer diameter toward the guide member 34 as shown in FIG. 9.

The length of the tapered portion 36b varies with the material of which the component 36 is made, and it generally ranges between one-third and two-thirds of the overall length of the component 36. The minimum outer diameter of the component 36 at its tapered or remote end is preferably equal to the outer diameter of its non-tapered portion less one-third to two-thirds of the difference between the outer diameter of the non-tapered portion and the diameter of the axial hole 36a. The outer diameter of the non-tapered portion of the component 36 is slightly smaller than the inner diameter of the casing 31, but when the component 36 is fitted in the casing 31, it is somewhat axially compressed by the coil spring 35 as the coil spring 35 presses the guide member 34 against the component 36 so that there exists a certain amount of frictional contact between the inner surface of the casing 31 and the outer peripheral surface of the component 36. The overall length of the component 36 may be selected in the range in which the following relationship exists:

$$S/S' < \mu$$

in which $S$ represents the cross-sectional area of the non-tapered portion of the component 36, $S'$ represents the outer peripheral surface area of the component 36 and $\mu$ represents the coefficient of friction between the inner surface of the casing 31 and the outer peripheral surface of the component 36.

The protuberances 33d on the inner piston rod 33c are adapted to prevent undesirable lateral expansion of the component 36 and damage caused to the component 36 by forcing the laterally expanded component 36 into the casing 31 during the assembly of the apparatus of the invention. When the apparatus is assembled, the coil spring 35 is first inserted into the casing 31, and then the piston and piston rod assembly with the component 36 and the guide member 34 fitted on the inner piston rod 33c is inserted into the casing 31 against the coil spring 35. Upon insertion of the guide member 34 into the casing 31 against the coil spring 35, the coil spring 35 presses the guide member 34 against the component 36, which is in turn pressed against the piston 33 resulting in lateral expansion. Such lateral expansion of the component 36 makes it difficult, if not impossible, to fit the component 36 into the casing 31, and if the component 36 is forced into the casing 31, damage to the component 36 is unavoidable. In order to avoid this sort of problem, the inner piston rod 33 c is provided with the protuberances 33d, and the guide member 34 with the notches 34b, according to this invention. In order to assemble the apparatus of the invention, the component 36 is inserted over the inner piston rod 33c against the piston rod 33c in such a manner that the protuberances 33d of the inner piston rod 33c are interposed between the guide member 34 and the component 36 and engaged with the perimeter of the opening 34a of the guide member 34 in a non-aligned relationship to the notches 34b. The coil spring 35 is inserted into the casing 31 and engaged against the inner surface of the closed end 31a thereof at its inner end. Then, the annular slope 34c of the guide member 34 is held against the outer end of the coil spring 35, and the piston and piston rod assembly carrying the component 36 and the guide member 34 thereon is inserted into the casing 31 against the coil spring 35. Since the guide member 34 is prevented by the protuberances 33d of the inner piston rod 33c from movement toward the component 36 despite the action of the coil spring 35, the component 36 maintains its original shape without any axial compression and lateral expansion during the insertion of the piston and piston rod assembly into the casing 31. The component 36 can easily be fitted into the casing 31 without suffering any damage. When the piston 33 is brought into a position inwardly of the annular groove 31b of the casing 31 as shown in FIG. 9, the seal member 32 is placed in the annular groove 31b and the peripheral edge of the casing 31 at the open end thereof is crimped inwardly over the metal element 32a to hold the seal member 32 in position to hold the piston and piston rod assembly against detachment from the casing 31. Finally, the outer piston rod 33a is rotated to bring the protuberances 33d on the inner piston rod 33c into alignment with the notches 34b of the guide member 34, whereupon the guide member 34 is forced by the coil spring 35 into contact with the component as shown in FIG. 9. The apparatus can be easily assembled, especially where the deformable component 36 is not affected by the action of the coil spring 35 during assembly.

According to the embodiment described referring to FIGS. 9 – 13, it is possible to operate the apparatus successfully by maintaining the friction stress acting on the deformable component substantially equal to the maximum allowable shearing stress $\tau$ max for the deformable component, because the pressure exerted by the component on the casing and represented by the formula $p\,v/1 - v$ is equal to or greater than $\tau\max/\mu$ at a given speed of a vehicle at the time of its collision, if the ratio of the cross sectional area $S$ (the non-tapered portion of the deformable component) to the outer circumferential surface area $S'$ of the component is selected to satisfy $S/S' < \mu$ in which $\mu$ represents the coefficient of friction between the inner surface of the casing and the outer circumferential surface of the deformable component. The shock absorbing force developed in this case by the apparatus is represented by the following formula:

$$Fa = S' \times \tau \max + Fb$$

In order that the foregoing formula may be satisfied, the relationships represented by the following formulas must be established:

$$p\,v/1 - v \geqq \tau\max/\mu$$
$$p = Fa/s \div S'/S\,\tau\max$$

accordingly, $$S/S' < v$$

Therefore, the overall length of the deformable component must be selected such that the ratio of the cross sectional area $S$ of the component at the non-tapered portion thereof to the outer peripheral surface area $S'$ of the component may be less than the coefficient of friction between the inner surface of the casing and the outer peripheral surface of the component.

In the event a force greater than the maximum allowable shearing stress for the deformable component is exerted on the deformable component as a result of excessive impact applied to the apparatus, excessive deformation may develop and cause damage to the inner or smaller end of the deformable component 36. In order to prevent any force greater than the maximum allowable shearing stress for the deformable component from being exerted on the inner end of the deformable component, a tapered portion is provided on the inner end of the deformable component according to this invention. The length of the tapered portion is preferably in the range between one-third and two-thirds of the overall length of the deformable component, and the minimum outer diameter of the tapered portion is preferably equal to the outer diameter of the non-tapered portion less one-third to two-thirds of the difference between the outer diameter of the non-tapered portion and the diameter of the axial hole of the deformable component.

As an example of a suitable shock absorber apparatus, the deformable component 36 has a 2.5 cm O.D., and is 4.4 cm long. It is made of polybutadiene rubber having a hardness of 80°, a coefficient of dynamical friction of 0.3 and a maximum allowable shearing stress of 80 kg/cm$^2$. The tapered portion 36$b$ is 1.4 cm in length and has a smallest outer diameter of 1.9 cm at its inner end contacting the guide member 34.

Figure 14:
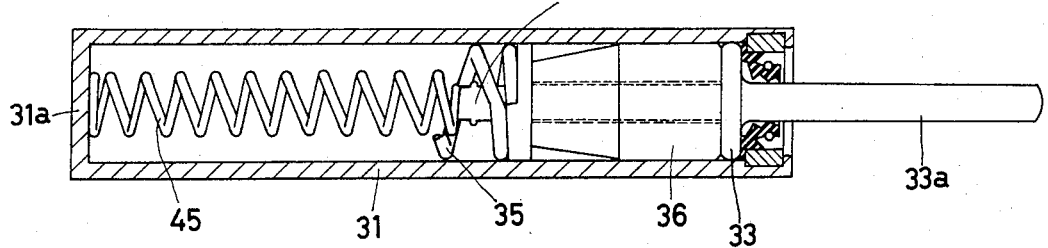
FIG. 14 is a vertical sectional view of still another preferred embodiment of this invention.

Referring to FIG. 14, still another embodiment of this invention shown therein is similar to the embodiment of FIG. 9, but further includes an auxiliary coil spring 45 interposed between the closed end 31$a$ of the casing 31 and the inner end of the inner piston rod 33$c$ and extending through the main coil spring 35. The auxiliary coil spring 45 is of the pig tail end type and has a pig tail end with a reduced diameter substantially equal to the diameter of the inner piston rod 33$c$. The pig tail end of the auxiliary coil spring 45 is closely engaged with the inner end of the inner piston rod 33$c$ so that the action of the auxiliary coil spring 45 may be directly exerted on the inner piston rod 33$c$ and cooperate with the main coil spring 35 to bring the piston and piston rod assembly back to its original position after an impact.

The foregoing is directed to the preferred embodiments of the present invention, and the scope thereof is determined by the appended claims.

I claim:

1. A vehicular collision impact absorbing apparatus comprising:
    a hollow elongate casing open at one end and closed at the other end, said open end having a closure means;
    an elongate elastically deformable component positioned in said casing and having an axial hole therethrough, said deformable component comprising a cylindrical portion toward one end and a tapered portion toward the other end, said cylindrical portion having an outer peripheral surface in contact with the inner surface of said casing, said deformable component having an overall length satisfying the formula $S/S' < \mu$, where $S$ represents the cross-sectional area of said cylindrical portion, $S'$ represents the outer peripheral surface area of said deformable component and $\mu$ represents the coefficient of friction between the inner surface of said casing and said outer surface of said deformable component, said tapered portion having a length equal to one-third to two-thirds of said overall length of said deformable component, and a minimum outer diameter equal to the outer diameter of said cylindrical portion less one-third to two-thirds of the difference between the outer diameter of said cylindrical portion and the diameter of said axial hole;
    a piston positioned in said casing and having one side contacting said one end of said deformable component;
    a first piston rod connected at one end to said one side of said piston and extending through said axial hole of said deformable component, said first piston rod having a diameter slightly smaller than that of said axial hole;
    a second piston rod connected at one end to the other side of said piston and extending in a direction opposite to said first piston rod, said second piston rod slidably extending through said open end of said casing, and the other end of said second piston rod serving as a means for fastening the apparatus to a vehicle;
    a guide member provided slidably inside said casing and having one side contacting said other end of said deformable component, said guide member being centrally provided with an opening which is coaxial with said axial hole of said deformable component and through which said first piston rod slidably extends; and
    elastic support means positioned in said casing and interposed between said closed end of said casing and the other side of said guide member to press against said guide member for restoring said deformable component to a beginning position.

2. The apparatus as defined in claim 1 wherein said elastic support means comprises a coil spring contacting said other side of said guide member at one end thereof and held against said closed end of said casing at the other end.

3. The apparatus as defined in claim 1 wherein said deformable component is maintained under a minimum pressure by said elastic support means such that a predetermined initial frictional drag force is generated between the outer surface of said deformable component and the inner surface of said casing.

4. The apparatus as defined in claim 1 wherein said first piston rod has a pair of protuberances formed thereon in a diametrically opposite relation to each other near the other end thereof.

5. The apparatus as defined in claim 1 further including auxiliary elastic support means interposed between said closed end of said casing and the other end of said first piston rod and adapted to directly press against said first piston rod, thereby cooperating with said elastic support means for restoring said deformable component to said beginning position.

6. The apparatus as defined in claim 1 wherein said closure means comprises seal means and means for retaining said seal means in said casing to retain said piston in said casing.

7. The apparatus as defined in claim 2 wherein said other side of said guide member includes an annular slope formed along the outer periphery of said guide member, said annular slope being complementary to said one end of said coil spring.

8. The apparatus as defined as in claim 4 wherein said guide member includes a pair of axially extending slits formed on the periphery of said opening in a diametrically opposite relation to each other, said slits being substantially complementary to said protuberances on said first piston rod.

9. The apparatus as defined in claim 5 wherein said auxiliary elastic support means is a pig tail end coil spring, the pig tail end thereof being engaged with said other end of said first piston rod.

10. The apparatus as defined in claim 6 wherein said seal means comprises a rubber seal element encircling said second piston rod and closing said open end of said casing and a metal element supporting said rubber seal element therein and fitted against the inner surface of said casing at said open end thereof.

11. The apparatus as defined in claim 6 wherein said retaining means comprises an annular inwardly extending bend formed at said open end of said casing and held against said seal means.

* * * * *